(12) United States Patent
Kumar et al.

(10) Patent No.: US 10,098,127 B2
(45) Date of Patent: Oct. 9, 2018

(54) TECHNIQUES AND APPARATUSES FOR DIFFERENTIAL BACK-OFF FOR LONG TERM EVOLUTION ADVANCED (LTE-A) UPLINK CARRIER AGGREGATION (ULCA)

(71) Applicant: QUALCOMM Incorporated, San Diego, CA (US)

(72) Inventors: Akash Kumar, Hyderabad (IN); Subbarayudu Mutya, Hyderabad (IN); Ankit Maheshwari, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 39 days.

(21) Appl. No.: 15/401,609

(22) Filed: Jan. 9, 2017

(65) Prior Publication Data

US 2018/0199348 A1    Jul. 12, 2018

(51) Int. Cl.
| | |
|---|---|
| *H04W 72/08* | (2009.01) |
| *H04W 72/04* | (2009.01) |
| *H04W 52/34* | (2009.01) |
| *H04W 52/14* | (2009.01) |
| *H04W 52/36* | (2009.01) |

(52) U.S. Cl.
CPC ......... *H04W 72/08* (2013.01); *H04W 52/146* (2013.01); *H04W 52/34* (2013.01); *H04W 52/36* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 8,744,513 B2 | 6/2014 | Chen et al. | |
| 9,426,752 B2 | 8/2016 | Zhang et al. | |
| 9,894,678 B2 * | 2/2018 | Tejedor | H04W 72/1257 |
| 2010/0029320 A1 * | 2/2010 | Malladi | H04L 27/2614 |
| | | | 455/522 |

(Continued)

FOREIGN PATENT DOCUMENTS

WO    2012061582 A1    5/2012

OTHER PUBLICATIONS

NEC Group: "Consideration on the Required Maximum Power Back-off for Clustered DFT-S-OFDM", R1-102260, 3GPP TSG RAN WG1 Meeting #60bis, 6.2.6, Beijing, China, Apr. 12-16, 2010, pp. 1-8.

(Continued)

*Primary Examiner* — Brian S Roberts
(74) *Attorney, Agent, or Firm* — Harrity & Harrity, LLP\Qualcomm

(57) ABSTRACT

Certain aspects of the present disclosure generally relate to wireless communication. A wireless communication device may determine a plurality of differential back-off values based at least in part on at least one of a set of parameter values relating to one or more of a plurality of uplink carriers associated with uplink carrier aggregation or any uplink grants associated with the plurality of uplink carriers. The plurality of differential back-off values may relate to a specific absorption rate (SAR) back-off or a thermal back-off of the wireless communication device. The wireless communication device may apply the plurality of differential back-off values to a respective plurality of transmit powers associated, respectively, with the plurality of uplink carriers.

30 Claims, 10 Drawing Sheets

(56) References Cited

U.S. PATENT DOCUMENTS

| | | | | |
|---|---|---|---|---|
| 2011/0319123 A1* | 12/2011 | Kwun | ................... | H04W 52/16 |
| | | | | 455/522 |
| 2012/0147801 A1 | 6/2012 | Ho et al. | | |
| 2012/0172079 A1* | 7/2012 | Baldemair | .......... | H04W 52/367 |
| | | | | 455/522 |
| 2012/0176979 A1* | 7/2012 | Kim | ................... | H04W 52/146 |
| | | | | 370/329 |
| 2012/0178494 A1* | 7/2012 | Haim | ................. | H04W 52/365 |
| | | | | 455/522 |

OTHER PUBLICATIONS

Panasonic: "Influence of UE Power Back-off to System Performance for Clustered PUSCH Transmission", R1-102033, 3GPP TSG-RAN WG1 Meeting #60bis, 6.2.6 PUSCH Resource allocation, Beijing, China, Apr. 12-16, 2010, pp. 1-5.
Wang H., et al., "Radio Resource Management for Uplink Carrier Aggregation in LTE-Advanced", EURASIP Journal on Wireless Communications and Networking, 2015, pp. 1-15.
International Search Report and Written Opinion—PCT/US2017/067589—ISA/EPO—dated Mar. 29, 2018.

* cited by examiner

TECHNIQUES AND APPARATUSES FOR DIFFERENTIAL BACK-OFF FOR LONG TERM EVOLUTION ADVANCED (LTE-A) UPLINK CARRIER AGGREGATION (ULCA)

FIELD OF THE DISCLOSURE

Aspects of the present disclosure generally relate to wireless communication, and more particularly to techniques and apparatuses for differential back-off for long term evolution advanced (LTE-A) uplink carrier aggregation (ULCA).

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include determining, by a wireless communication device, a plurality of differential back-off values based at least in part on at least one of a set of parameter values relating to one or more of a plurality of uplink carriers associated with uplink carrier aggregation or any uplink grants associated with the plurality of uplink carriers. The plurality of differential back-off values may relate to a specific absorption rate (SAR) back-off or a thermal back-off of the wireless communication device. The method may include applying, by the wireless communication device, the plurality of differential back-off values to a respective plurality of transmit powers associated, respectively, with the plurality of uplink carriers.

In some aspects, a wireless communication device may include a memory and one or more processors operatively coupled to the memory. The one or more processors may be configured to determine a plurality of differential back-off values based at least in part on at least one of a set of parameter values relating to one or more of a plurality of uplink carriers associated with uplink carrier aggregation or any uplink grants associated with the plurality of uplink carriers. The plurality of differential back-off values may relate to a SAR back-off or a thermal back-off of the wireless communication device. The one or more processors may be configured to apply the plurality of differential back-off values to a respective plurality of transmit powers associated, respectively, with the plurality of uplink carriers.

In some aspects, an apparatus for wireless communication may include means for determining a plurality of differential back-off values based at least in part on at least one of a set of parameter values relating to one or more of a plurality of uplink carriers associated with uplink carrier aggregation or any uplink grants associated with the plurality of uplink carriers. The plurality of differential back-off values may relate to a SAR back-off or a thermal back-off of the apparatus. The apparatus may include means for applying the plurality of differential back-off values to a respective plurality of transmit powers associated, respectively, with the plurality of uplink carriers.

In some aspects, a non-transitory computer-readable medium may store one or more instructions for wireless communication. The one or more instructions, when executed by one or more processors of a wireless communication device, may cause the one or more processors to determine a plurality of differential back-off values based at least in part on at least one of a set of parameter values relating to one or more of a plurality of uplink carriers associated with uplink carrier aggregation or any uplink grants associated with the plurality of uplink carriers. The plurality of differential back-off values may relate to a SAR back-off or a thermal back-off of the wireless communication device. The one or more instructions, when executed by the one or more processors, may cause the one or more processors to apply the plurality of differential back-off values to a respective plurality of transmit powers associated, respectively, with the plurality of uplink carriers.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1x radio transmission technology (1xRTT), CDMA2000 1x, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
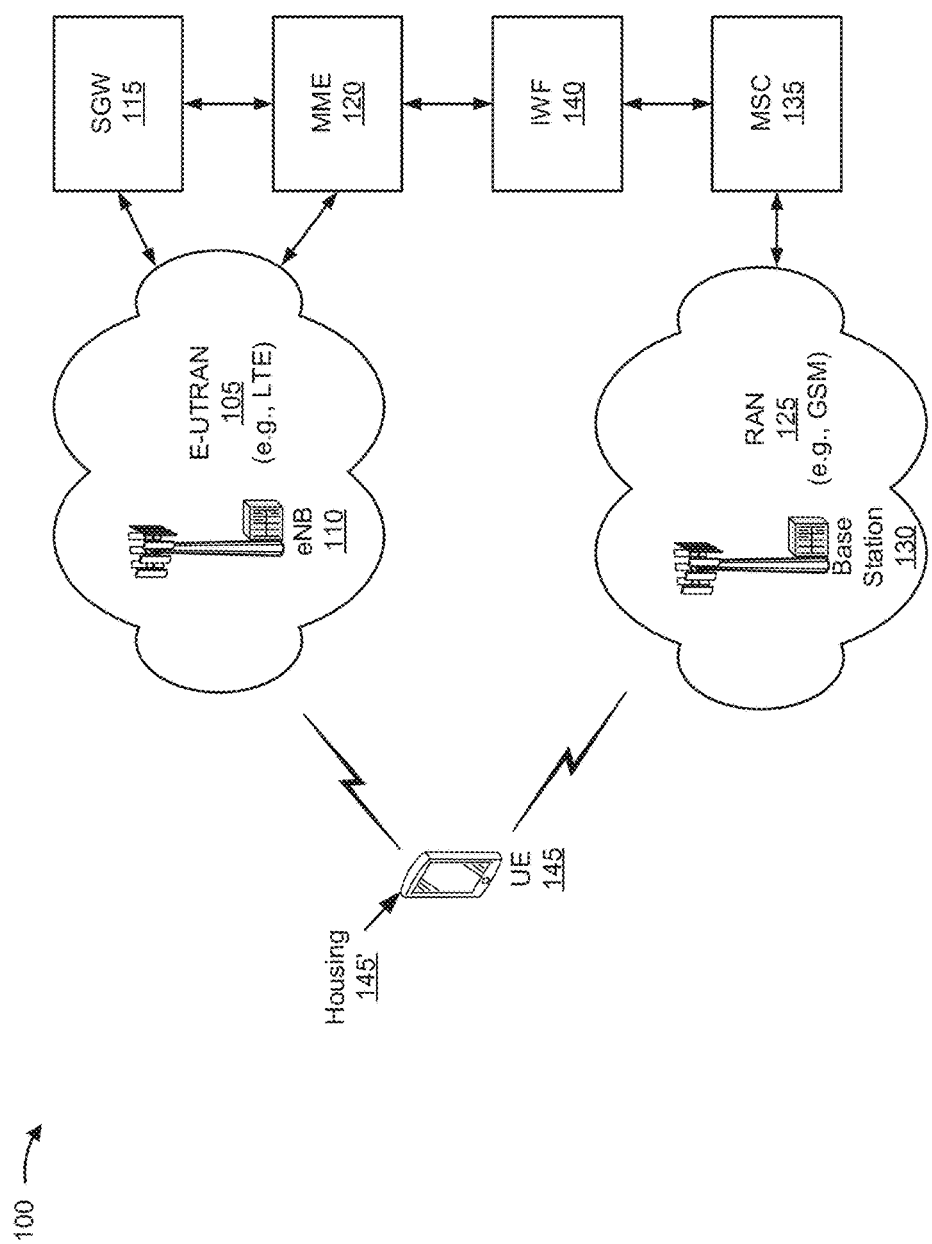
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

UE 145 may support uplink carrier aggregation (ULCA). For example, UE 145 may transmit information using multiple uplink carriers, each of which may be associated with different transmit powers, radio frequency (RF) energy output, thermal radiation, and/or the like. Regulatory agencies, such as the Federal Communications Commission (FCC) in the United States, may promulgate regulations regarding a specific absorption rate (SAR) relating to emissions from UEs. To comply with such regulations, UE 145 may determine a total power of the multiple uplink carriers, and may identify a back-off value. For example, UE 145 may identify a SAR back-off value, and may apply the SAR back-off value to each uplink carrier being provided by UE 145. In this way, UE 145 may avoid exceeding SAR limitations or a limitation relating to another output, such as a thermal output.

However, a first uplink carrier may be associated with a first set of channel conditions and a second uplink carrier may be associated with a second set of channel conditions, resulting in differing performance when the same SAR back-off value is applied to both the first uplink carrier and the second uplink carrier. Moreover, when a particular uplink carrier is operating near a power amplifier switch point, reducing a SAR back-off value may cause a power amplifier to change to a different power amplifier state resulting in inefficient performance.

UE 145 may determine a first differential back-off value for the first uplink carrier and a second, different differential back-off value for the second uplink carrier based at least in part on a set of parameter values. The set of parameter values may relate to the uplink carriers, a UL grant of the uplink carriers, a determination regarding a transmission in a set of upcoming radio frames, channel conditions associated with the uplink carriers, power amplifier switch points associated with the uplink carriers, and/or the like. In this case, UE 145 may apply the first back-off value to the first uplink carrier and the second back-off value to the second uplink carrier to satisfy a threshold relating to a SAR, a thermal radiation, and/or the like.

In this way, UE 145 improves network throughput relative to applying a single back-off value to all uplink carriers, resulting in some carriers, with poor channel conditions, experiencing relatively high signal to interference noise ratio (SINR) values, quantities of retransmissions, and/or the like. Moreover, UE 145 reduces power consumption relative to applying a single back-off value to all uplink carriers based at least in part on improving and/or optimizing a power amplifier state for each uplink carrier.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
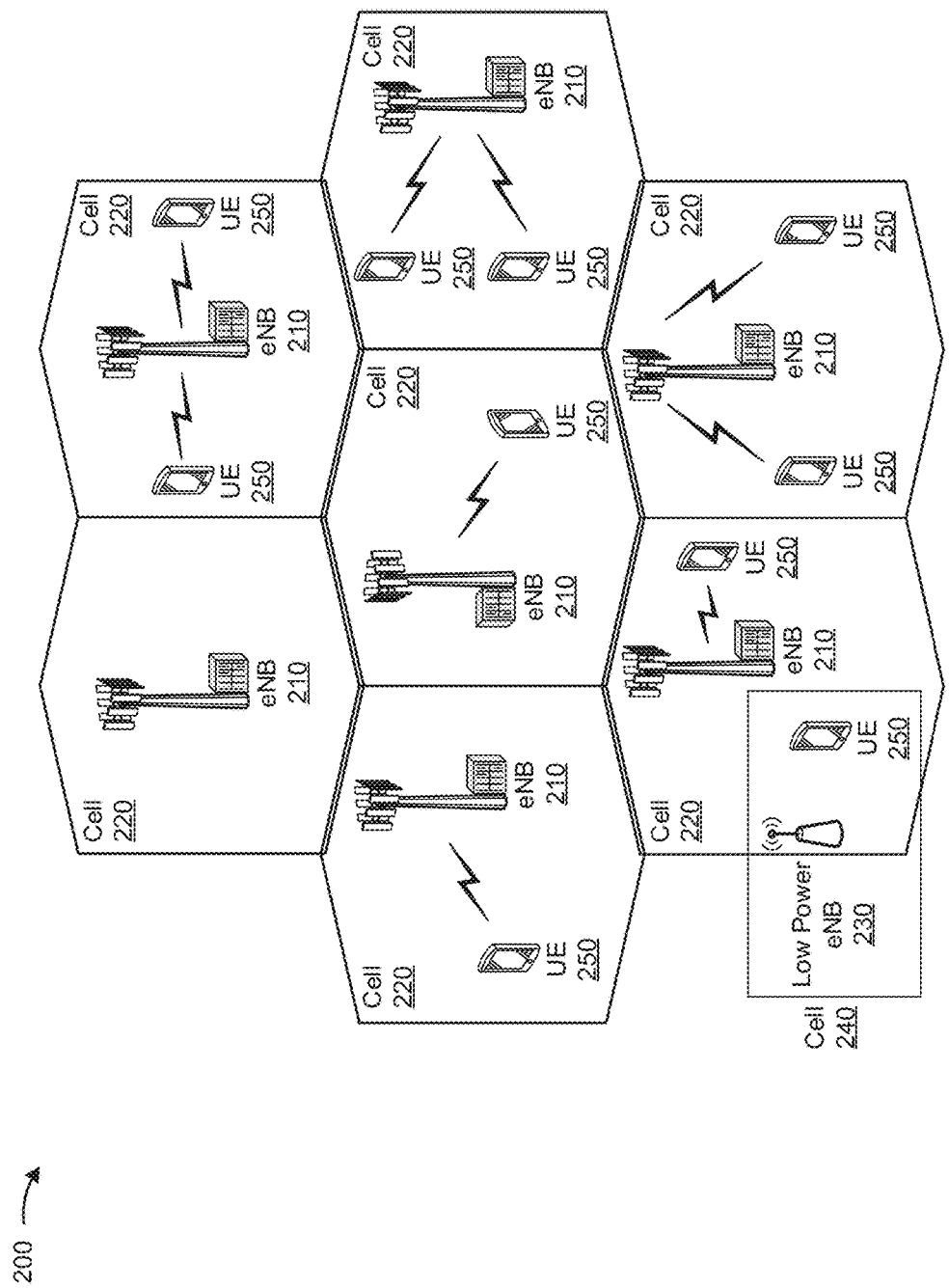
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

UE 145, 250 may determine a set of differential back-off values for a set of uplink carriers provided by UE 145, 250 based at least in part on a set of parameter values. For example, UE 145, 250 may decode a physical downlink control channel (PDCCH) to determine a parameter value indicating that an uplink carrier has a discontinuous transmission period or no transmission in an upcoming radio frame, to determine an uplink grant of the carrier, and/or the like. Additionally, or alternatively, UE 145, 250 may obtain a set of measurements regarding an uplink carrier to determine a parameter identifying an uplink SINR value for the uplink carrier or a quantity of UL retransmissions for the uplink carrier. Additionally, or alternatively, UE 145, 250 may determine a parameter value relating to a transmit power and/or a power amplifier switch point for a power amplifier associated with an uplink carrier. After determining the set of differential back-off values for the set of uplink carriers based at least in part on the set of parameter values, UE 145, 250 may apply the set of differential back-off values to transmit powers associated with the set of uplink carriers. In this way, UE 145, 250 satisfies a SAR threshold or a thermal emission threshold and improves network throughput relative to applying a single back-off value to the multiple uplink carriers.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
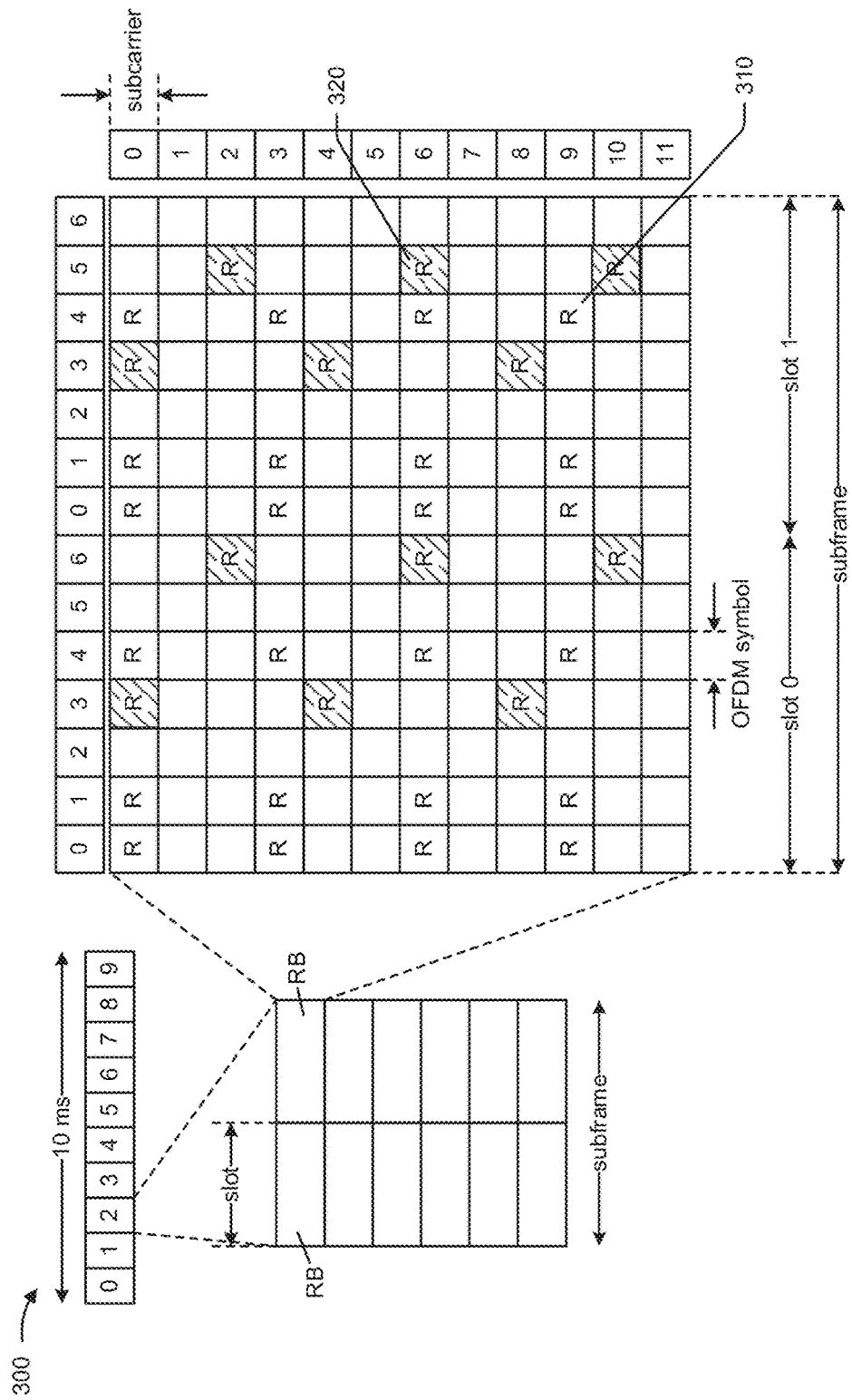
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

UE 145, 250 may receive information from eNB 110, 210, 230 via a DL frame, as described herein. For example, UE 145, 250 may decode information included in a DL frame, such as a PDCCH, a set of measurements regarding channel conditions of a set of uplink carriers, and/or the like. Based at least in part on decoding the information included in the DL frame, UE 145, 250 may determine a set of differential back-off values for a set of uplink carriers, and may apply the set of differential back-off values to a set of transmit powers of the set of uplink carriers. In this way, UE 145, 250 satisfies a SAR threshold or a thermal emission threshold with improved network throughput relative to applying a single back-off value to each uplink carrier.

As indicated above, FIG. 3 is provided as an example. Other examples are possible and may differ from what was described above in connection with FIG. 3.

Figure 4:
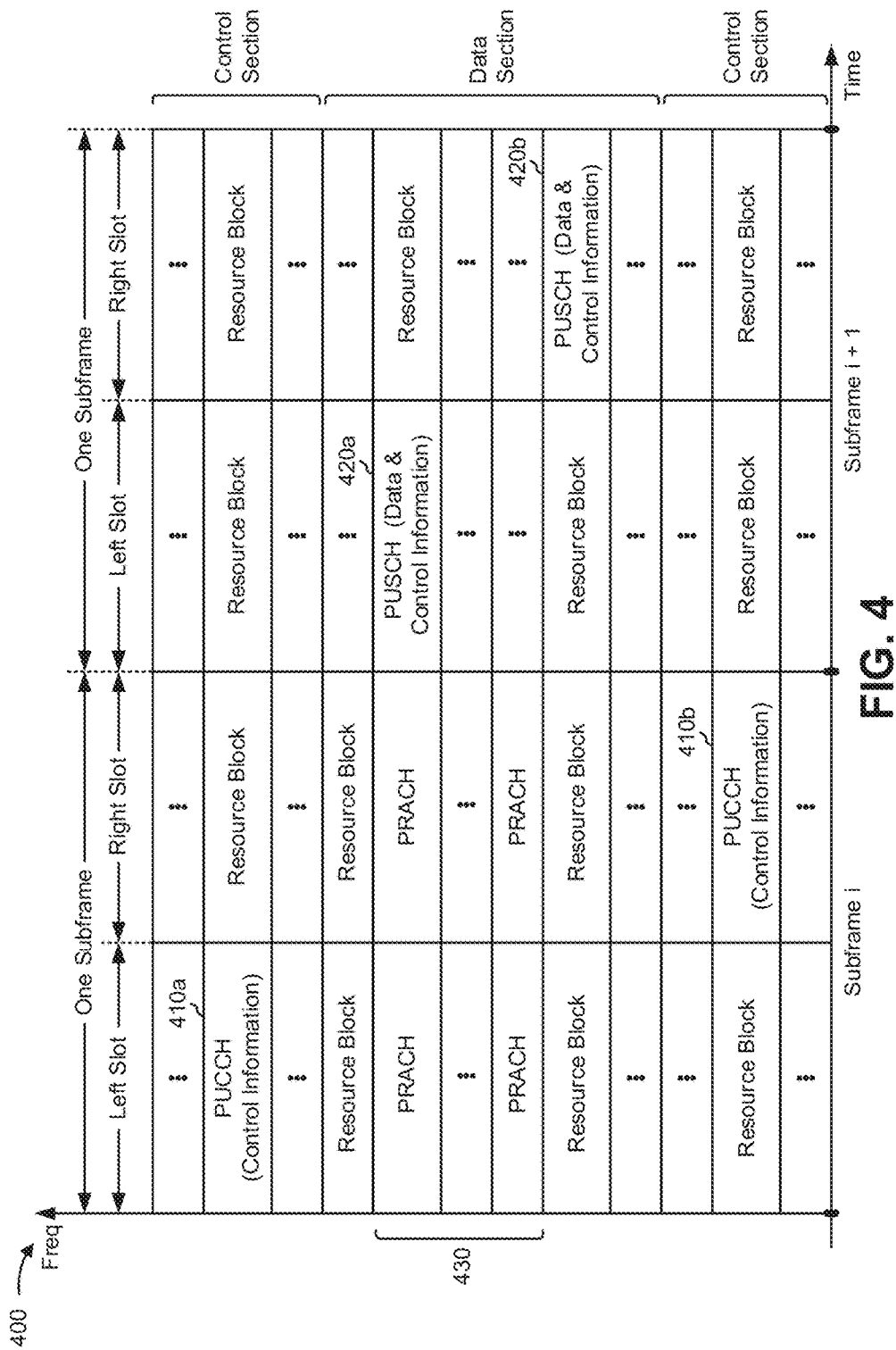
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

UE 145, 250 may transmit one or more signals via a UL frame, as described herein. For example, UE 145, 250 may transmit a set of uplink carriers associated with a set of channels via a set of UL frames. In this case, UE 145, 250 may apply a set of differential back-off values to transmit powers of the set of uplink carriers to satisfy a SAR threshold or a thermal emission threshold without adversely effecting communication associated with the set of uplink carriers. In this way, UE 145, 250 improves network performance relative to applying a single back-off value to each uplink carrier without determining channel conditions or power amplifier state associated with each uplink carrier.

As indicated above, FIG. 4 is provided as an example. Other examples are possible and may differ from what was described above in connection with FIG. 4.

Figure 5:
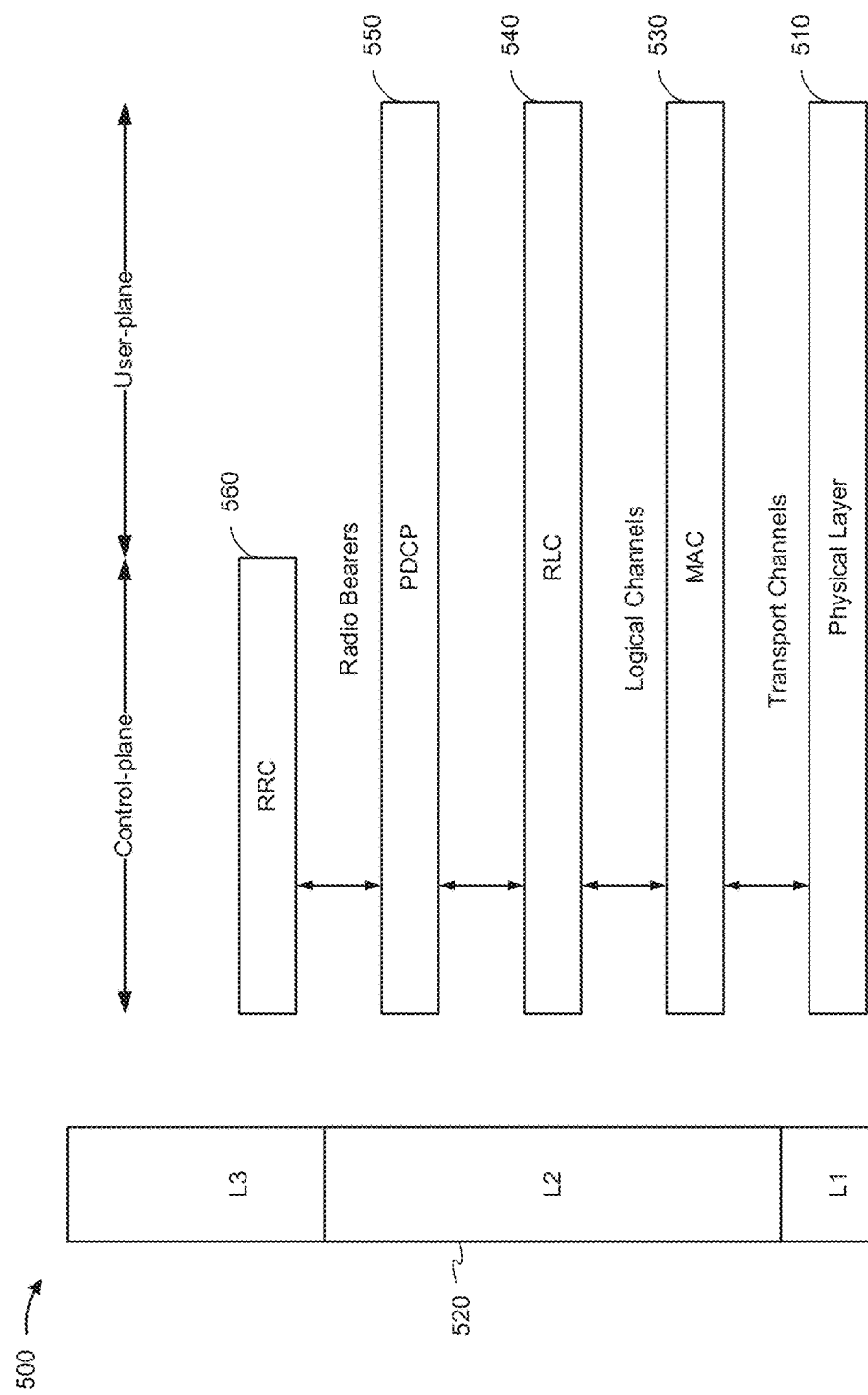
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
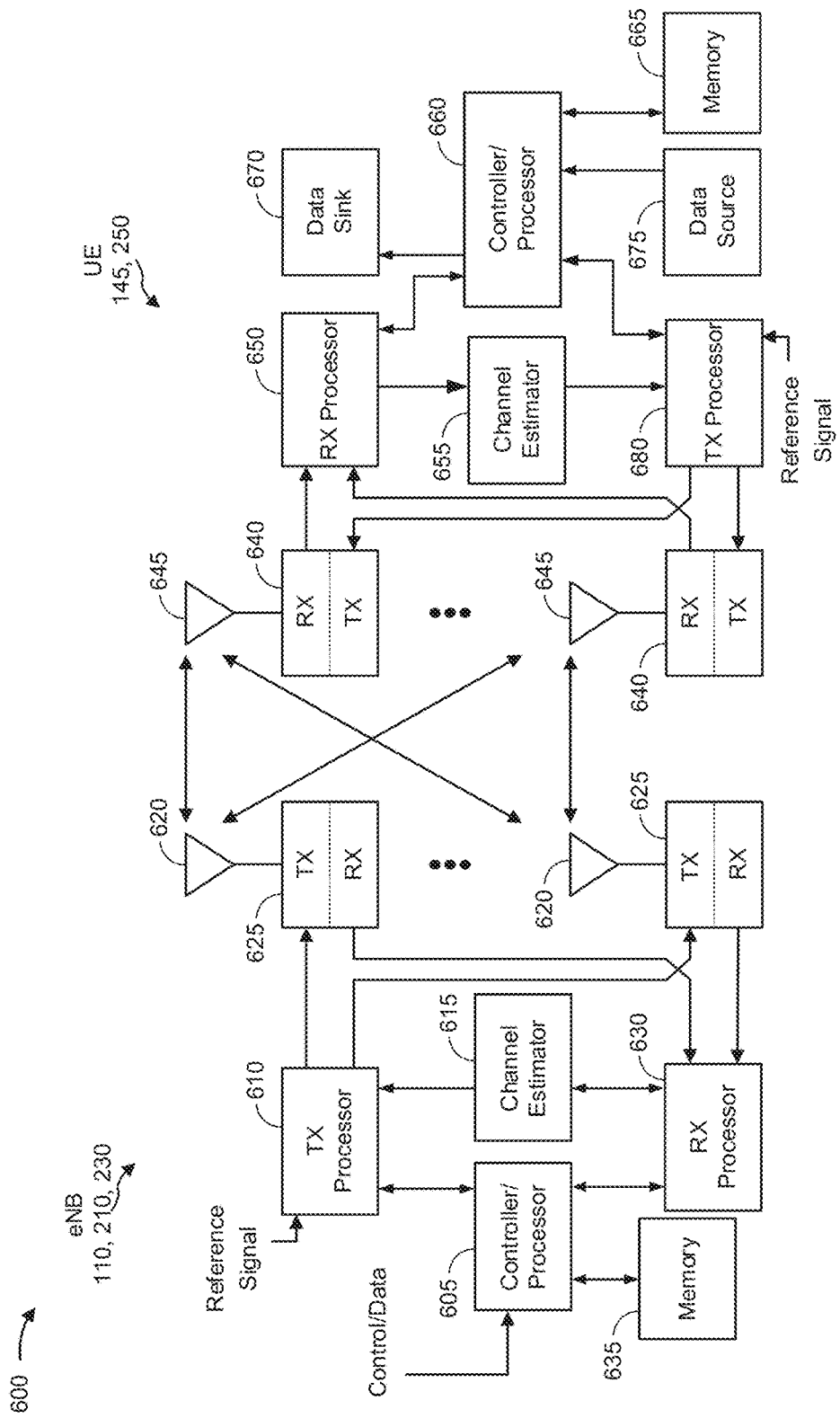
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing. One or more components of UE 145, 250 may be configured to apply a set of differential back-off values, as described in more detail elsewhere herein. For example, the controller/processor 660 and/or other processors and modules of UE 145, 250 may perform or direct operations of, for example, process 800 of FIG. 8 and/or other processes as described herein. In some aspects, one or more of the components shown in FIG. 6 may be employed to perform example process 800 and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

As described in more detail below, a wireless communication device, which may correspond to UE 145, 250, may determine a set of differential back-off values (e.g., SAR back-off values, thermal back-off values, and/or the like) based at least in part on a set of parameter values relating to a set of uplink carriers associated with ULCA or based at least in part on uplink grants associated with the set of uplink carriers. The wireless communication device may apply the set of differential back-off values to transmit powers associated with the set of uplink carriers. In this way, UE 145, 250 may satisfy a threshold relating to a SAR or thermal emissions of UE 145, 250. Moreover, UE 145, 250 may improve network throughput and/or reduce power consumption relative to applying a single back-off value to each transmit power associated with each uplink carrier.

Figure 7A:
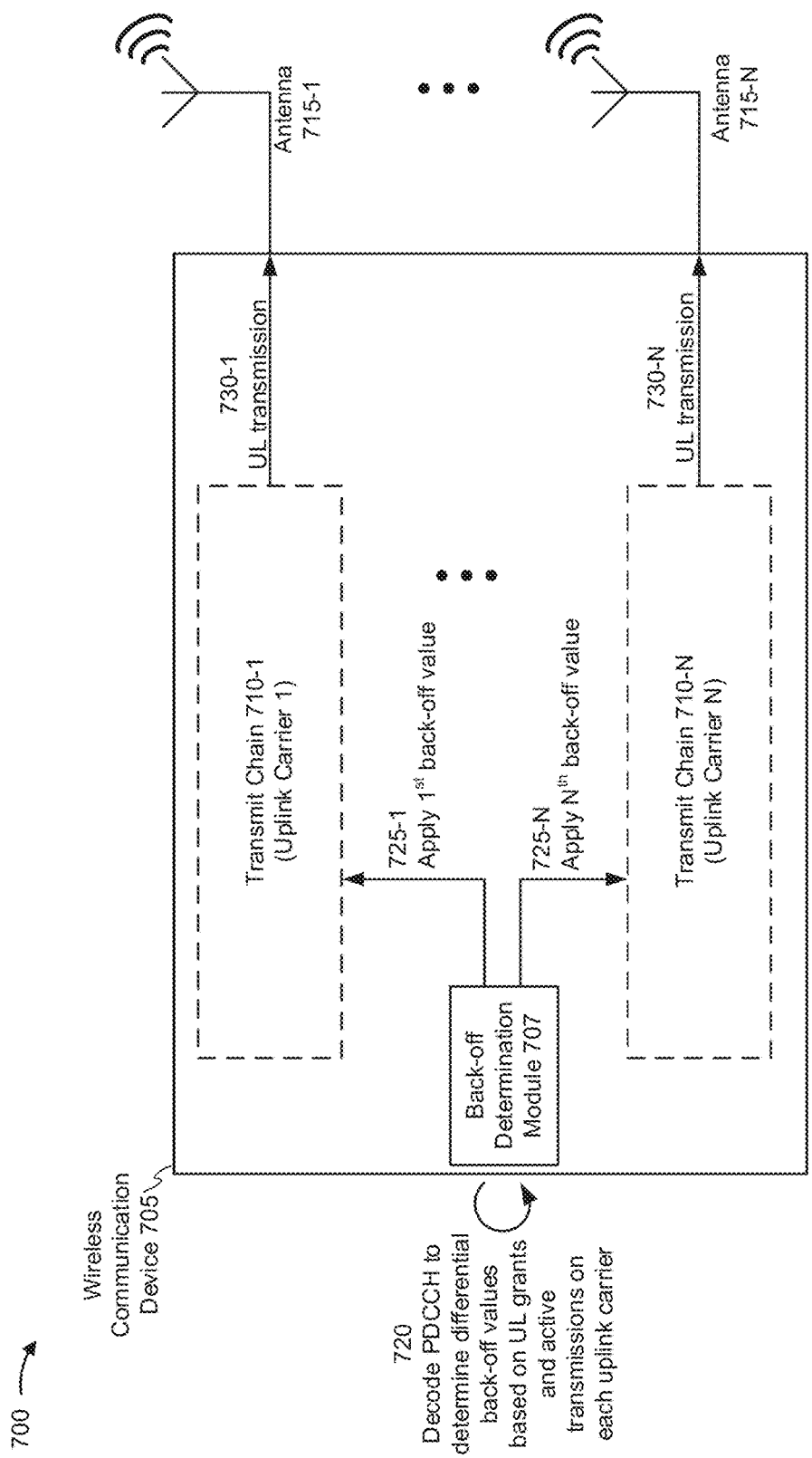
FIGS. 7A-7C are diagrams illustrating an example of differential back-off for LTE-A ULCA, in accordance with various aspects of the present disclosure.
Figure 7B:
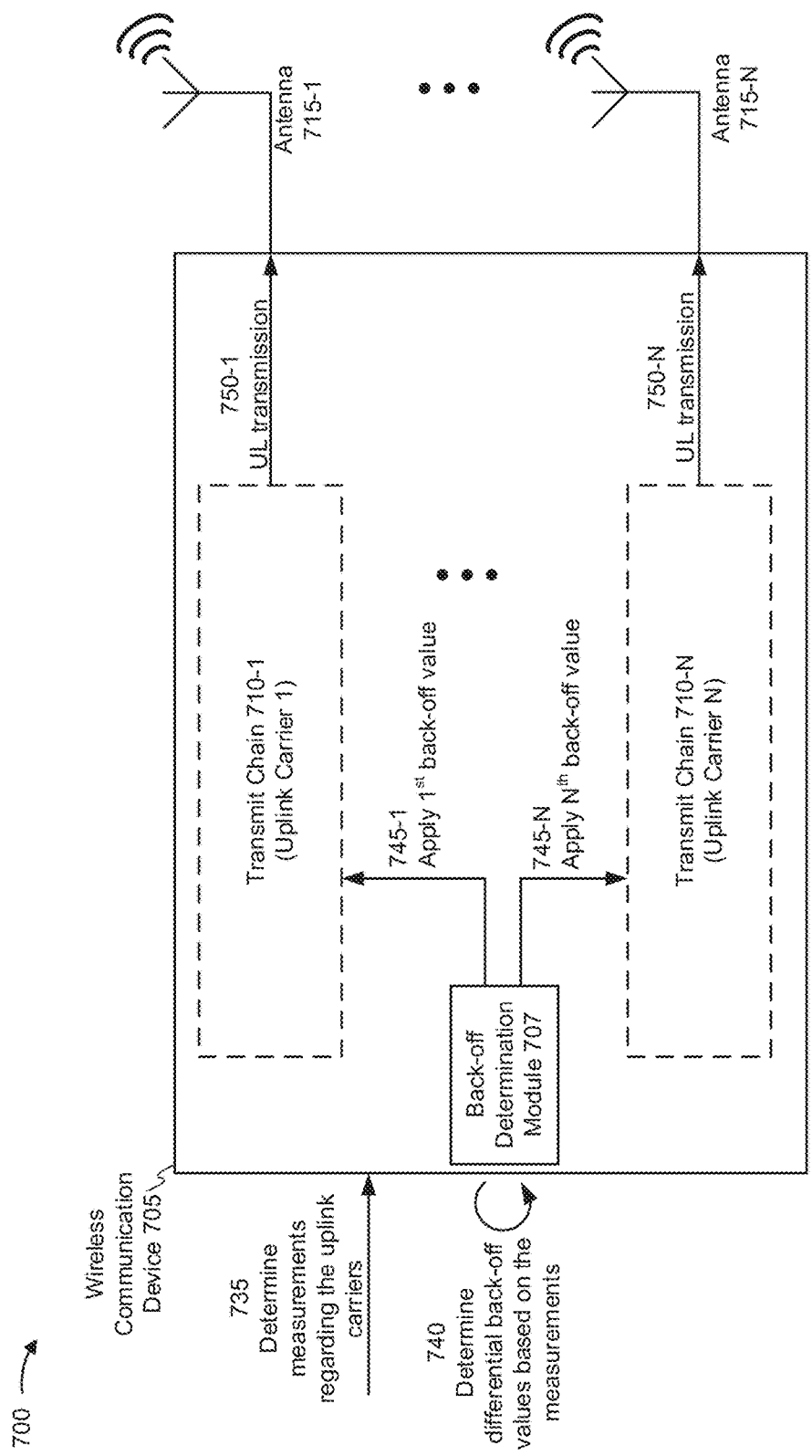
Figure 7C:
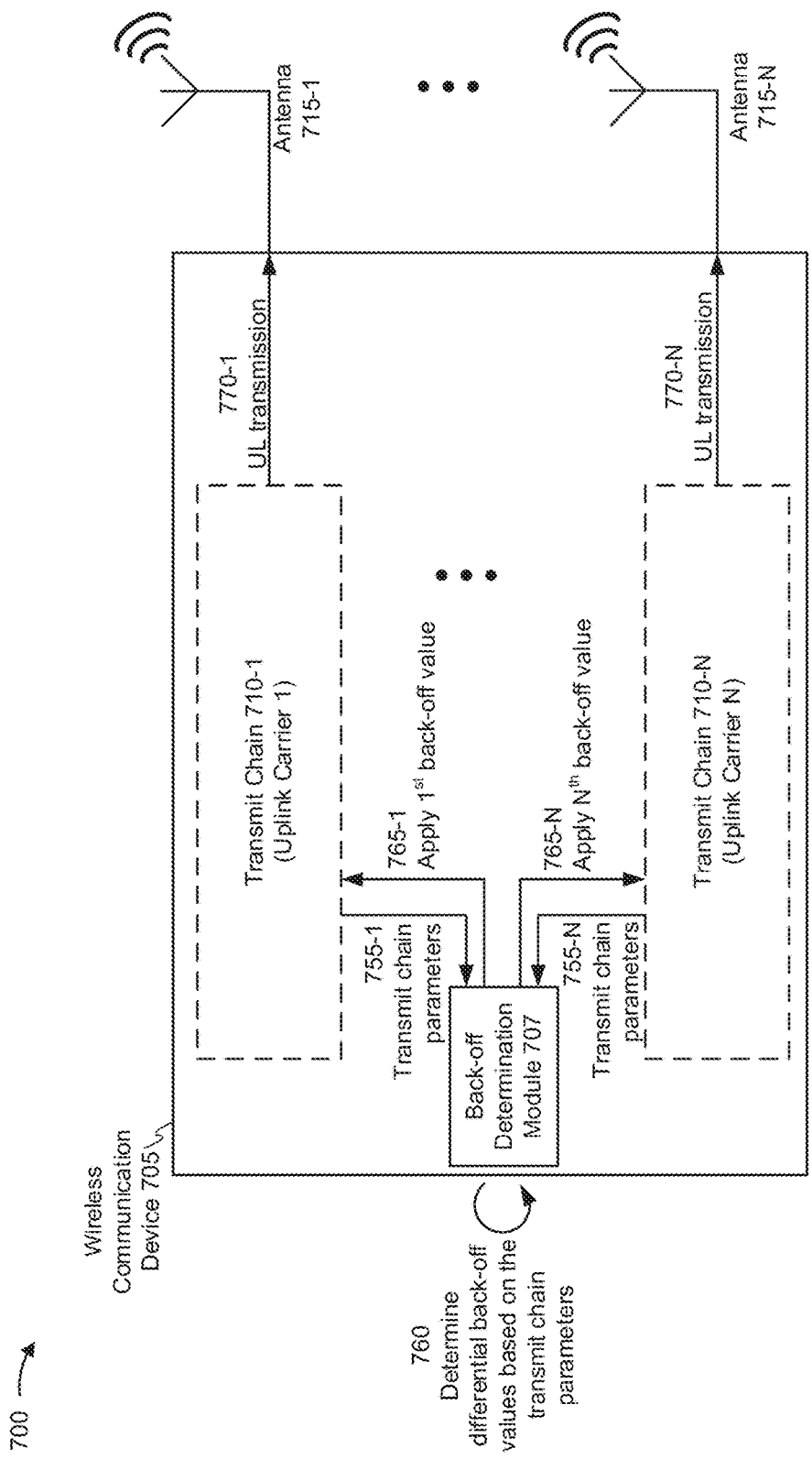

FIGS. 7A-7C are diagrams illustrating an example 700 of differential back-off for LTE-A in ULCA, in accordance with various aspects of the present disclosure.

As shown in FIG. 7A, example 700 may include a wireless communication device 705 (e.g., a UE, such as UE 145, 250). Wireless communication device 705 may include a back-off determination module 707 to determine a set of differential back-off values, as described herein. Wireless communication device 705 may include a set of transmit chains 710-1 through 710-N(N>1), which may each be associated with a corresponding antenna 715-1 through 715-N. For example, transmit chain 710-1 may be associated with providing a first uplink carrier via antenna 715-1, transmit chain 710-N may be associated with providing an nth uplink carrier via antenna 715-N, and/or the like. In some aspects, a transmit chain 710 may include a particular set of components, such as a digital-to-analog converter (DAC), a radio frequency (RF) transceiver path, a power amplifier (PA), and/or the like. Wireless communication device 705 may connect to a network using a particular RAT, such as an LTE-A RAT with ULCA, and may be associated with a particular SAR limitation threshold.

As further shown in FIG. 7A, and by reference number 720, wireless communication device 705 may decode a PDCCH to determine back-off values based at least in part on UL grants and active transmissions on each carrier. For example, wireless communication device 705 may decode the PDCCH of one or more uplink carriers associated with one or more transmit chains 710, and may identify a period of no transmissions and/or a discontinuous transmission period on a particular uplink carrier for a particular quantity of upcoming radio frames. In some aspects, the particular quantity of upcoming radio frames may be four upcoming radio frames. Additionally, or alternatively, wireless communication device 705 may determine an uplink grant of the one or more carriers based at least in part on decoding the PDCCH.

Wireless communication device 705 may determine a set of differential back-offs based at least in part on the period of no transmissions and/or the discontinuous transmission period. For example, when the particular carrier is associated with no transmissions during an upcoming radio frame, wireless communication device 705 may determine that a back-off is not necessary as a result of there being no transmissions during the upcoming radio frame. Alternatively, wireless communication device 705 may determine that the period of no transmissions during the upcoming radio frames does not result in satisfying a SAR threshold, and may determine a set of differential back-off values as a function of the uplink grants of the uplink carriers. The function may be calculated as:

$$(SAR_{back-off})_i = \alpha * (1/(UL_{grant})_i);$$

where $SAR_{back-off}$ represents an amount of back-off to apply to a power amplifier of a transmit chain 710-$i$, $\alpha$ represents a constant value, and $UL_{grant}$ represents an uplink grant of an uplink carrier of transmit chain 710-$i$. In this way, wireless communication device 705 ensures that uplink carriers contributing more to uplink throughput relative to other uplink carriers are treated preferentially with regard to transmit power, thereby reducing an overall throughput reduction relative to another technique for applying the same back-off to each transmit chain 710.

As further shown in FIG. 7A, and by reference numbers 725-1 through 725-N, in some aspects, wireless communication device 705 applies the set of differential back-off values to respective transmit powers provided by respective power amplifiers of transmit chains 710-1 through 710-N, respectively. For example, wireless communication device 705 may apply a first back-off value to a first transmit power of transmit chain 710-1 and an nth, different back-off value to an nth transmit power of transmit chain 710-N. As shown by reference numbers 730-1 through 730-N, wireless communication device 705 provides uplink transmissions of uplink carriers 1 through N via antennas 715-1 through 715-N based at least in part on applying the set of differential back-off values.

As shown in FIG. 7B, and by reference number 735, wireless communication device 705 may determine a set of measurements regarding the uplink carriers. For example, wireless communication device 705 may perform one or more measurements regarding the uplink carriers, may receive an indication of one or more measurements regarding the uplink carriers, and/or the like. In some aspects, the one or more measurements may relate to channel conditions associated with the uplink carriers. For example, wireless communication device 705 may determine a channel quality indicator (CQI) parameter value, a reference signal received power (RSRP) parameter value, a signal to interference plus noise ratio (SINR) parameter value, a quantity of uplink retransmissions value, a downlink parameter value corresponding to the uplink carriers, and/or the like.

As further shown in FIG. 7B, and by reference number 740, wireless communication device 705 may determine a set of differential back-off values for the set of uplink carriers based at least in part on the measurements. In some aspects, wireless communication device 705 may determine an uplink SINR parameter value based at least in part on one or more other parameter values, and may determine the set of differential back-off values based at least in part on the uplink SINR parameter value. For example, based at least in part on a CQI parameter value and an RSRP parameter value, wireless communication device 705 may determine an uplink SINR parameter value for each uplink carrier. In this case, wireless communication device 705 may determine the set of differential back-off values based at least in part on the uplink SINR parameter values. In this way, a relatively higher back-off is applied to uplink carriers determined to have better channel conditions (e.g., a higher uplink SINR parameter value) relative to other uplink carriers, thereby reducing a likelihood of negative network performance impacts (e.g., increased quantities of retransmissions) resulting from applying the back-off.

As further shown in FIG. 7B, and by reference numbers 745-1 through 745-N, in some aspects, wireless communication device 705 applies the set of differential back-off values to the respective transmit powers provided by the respective power amplifiers of transmit chains 710-1 through 710-N, respectively. In some aspects, wireless communication device 705 may apply the set of differential back-off values iteratively. For example, wireless communication device 705 may apply a first set of differential back-off values determined based at least in part on first measurements, may determine second measurements after applying the first set of differential back-off values, may determine a second set of differential back-off values based at least in part on second measurements, and may apply the second set of differential back-off values. As shown by reference numbers 750-1 through 750-N, wireless communication device 705 provides uplink transmissions of uplink carriers 1 through N via antennas 715-1 through 715-N based at least in part on applying the set of differential back-off values.

As shown in FIG. 7C, and by reference numbers 755-1 through 755-N, wireless communication device 705 may determine transmit chain parameters relating to transmit chains 710-1 through 710-N. For example, wireless communication device 705 may determine a set of power amplifier switch thresholds at which power amplifiers of transmit chains 710-1 through 710-N transition from first gain states to second gain states. Additionally, or alternatively, wireless communication device 705 may determine consumption values relating to RF transceivers or power amplifiers of transmit chains 710-1 through 710-N. As shown by reference number 760, wireless communication device 705 may determine a set of differential back-off values based at least in part on the transmit chain parameters. For example, wireless communication device 705 may identify a particular set of differential back-off values associated with improving and/or optimizing a gain state of the power amplifiers of transmit chains 710-1 through 710-N, thereby reducing a utilization of power resources, relative to utilizing a single back-off value for each transmit chain 710 regardless of the gain state switch threshold of each corresponding power amplifier.

In some aspects, wireless communication device 705 may select a particular set of differential back-off values from a group of candidate sets of differential back-off values based at least in part on the transmit chain parameters. For example, based at least in part on determining a first candidate set of differential back-off values based at least in part on uplink grants, as shown in FIG. 7A, and determining a second candidate set of differential back-off values based at least in part on a SINR determination, as shown in FIG. 7B, wireless communication device 705 may select from the first candidate set of differential back-off values or the second candidate set of different back-off values based at least in part on the transmit chain parameters. In this case, wireless communication device 705 may select, for example, the first candidate set of differential back-off values based at least in part on the transmit chain parameters indicating that the first candidate set of differential back-off values results in a reduced utilization of power resources relative to the second candidate set of differential back-off values. In this way, wireless communication device 705 reduces utilization of power resources relative to another technique, for selecting a back-off value, that does not use transmit chain parameters, such as power amplifier switch threshold values and/or the like.

As further shown in FIG. 7C, and by reference numbers 765-1 through 765-N, wireless communication device 705 applies the set of differential back-off values to the respective transmit powers provided by the respective power amplifiers of transmit chains 710-1 through 710-N, respectively. For example, wireless communication device 705 may apply the first candidate set of differential back-off values, the second candidate set of differential back-off values, and/or the like. As shown by reference numbers 770-1 through 770-N, wireless communication device 705 provides uplink transmissions of carriers 1 through N via antennas 715-1 through 715-N based at least in part on applying the set of differential back-off values.

As indicated above, FIGS. 7A-7C are provided as examples. Other examples are possible and may differ from what was described in connection with FIGS. 7A-7C.

Figure 8:
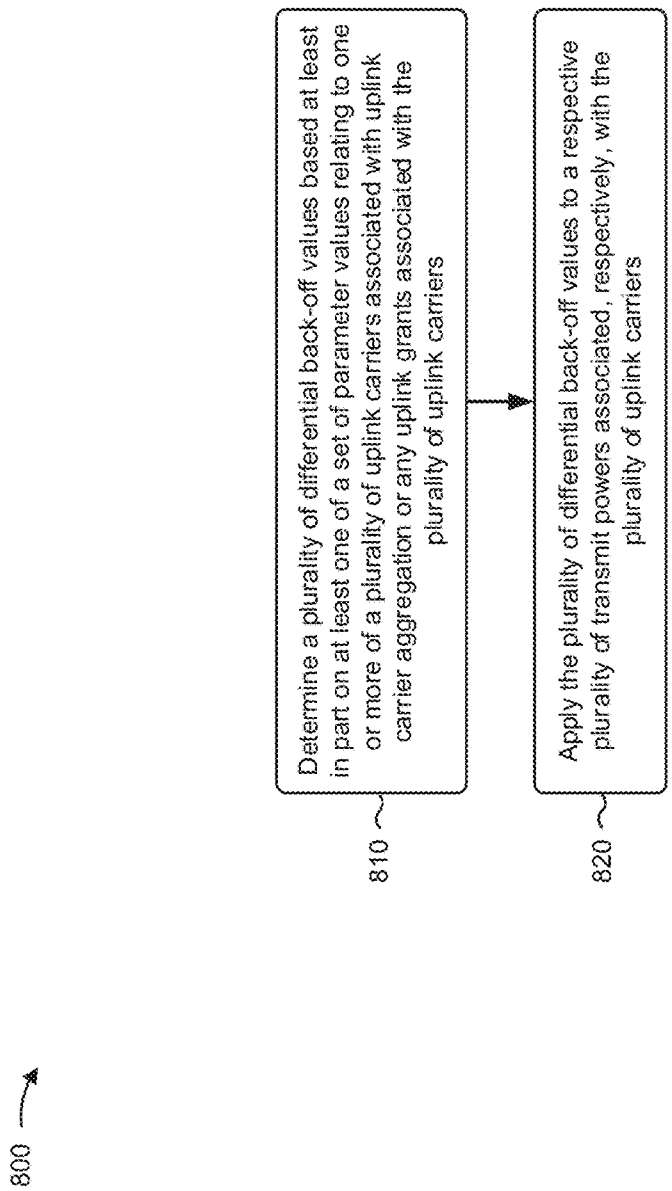
FIG. 8 is a diagram illustrating an example process performed, for example, by a wireless communication device, in accordance with various aspects of the present disclosure.

FIG. 8 is a diagram illustrating an example process 800 performed, for example, by a wireless communication device, in accordance with various aspects of the present disclosure. Example process 800 is an example where a wireless communication device (e.g., UE 145, 250 or wireless communication device 705) performs differential back-off for LTE-A in ULCA.

As shown in FIG. 8, in some aspects, process 800 may include determining a plurality of differential back-off values based at least in part on at least one of a set of parameter values relating to one or more of a plurality of uplink carriers associated with uplink carrier aggregation or any uplink grants associated with the plurality of uplink carriers (block 810). For example, the wireless communication device may determine the plurality of differential back-off values based at least in part on at least one of a set of parameter values relating to one or more of a plurality of uplink carriers associated with ULCA or any uplink grants associated with the plurality of uplink carriers. In some aspects, the plurality of differential back-off values may relate to a specific absorption rate (SAR) back-off or a thermal back-off of the wireless communication device.

In some aspects, the wireless communication device may determine a total back-off value for the plurality of transmit powers, and may determine the plurality of differential back-off values based at least in part on the total back-off value. In some aspects, a first back-off value, of the plurality of differential back-off values, is different from a second back-off value of the plurality of differential back-off values.

In some aspects, the wireless communication device may determine that at least one of the plurality of uplink carriers has at least one of a discontinuous transmission period or no transmission in one or more upcoming frames, and may determine the plurality of differential back-off values as a function of any uplink grants associated with the plurality of uplink carriers based at least in part on determining that the at least one of the plurality of uplink carriers has the at least one of the discontinuous transmission period or the no transmission in the one or more upcoming frames.

In some aspects, the wireless communication device may determine at least one of an uplink transmission or an uplink grant for one or more uplink carriers, of the plurality of uplink carriers, in one or more upcoming frames, and may determine the plurality of differential back-off values based at least in part on the uplink transmission or the uplink grant for the one or more uplink carriers in the one or more upcoming frames.

In some aspects, the wireless communication device may determine any uplink grants associated with the plurality of uplink carriers, and may determine the plurality of differential back-off values based at least in part on the uplink grants. In some aspects, the wireless communication device may determine the set of parameter values relating to the one or more of the plurality of uplink carriers. In some aspects, the set of parameter values may include at least one of a CQI parameter value, an RSRP parameter value, a SINR parameter value, a quantity of uplink retransmissions value, a downlink parameter value corresponding to one or more of the plurality of uplink carriers, and/or the like.

In some aspects, the wireless communication device may determine one or more of a plurality of power amplifier switch thresholds respectively associated with the plurality of uplink carriers, and may determine the plurality of differential back-off values based at least in part on the one or more of the plurality of power amplifier switch thresholds. In some aspects, the wireless communication device may determine a plurality of consumption values relating to at least one of a radio frequency transceiver or a power amplifier associated with an uplink carrier of the plurality of uplink carriers, and may determine the plurality of differential back-off values based at least in part on the plurality of consumption values relating to the radio frequency transceiver or the power amplifier.

As shown in FIG. 8, in some aspects, process 800 may apply the plurality of differential back-off values to a respective plurality of transmit powers associated, respectively, with the plurality of uplink carriers (block 820). For example, the wireless communication device may apply the plurality of differential back-off values to a respective plurality of transmit powers associated, respectively, with the plurality of uplink carriers.

In some aspects, the wireless communication device may determine that at least one of the of the plurality of uplink carriers has at least one of a discontinuous transmission period or no transmission in one or more upcoming frames, and may determine whether to apply the plurality of differential back-off values to the plurality of transmit powers based at least in part on determining that the at least one of the plurality of uplink carriers has the at least one of the discontinuous transmission period or the no transmission in the one or more upcoming frames.

In some aspects, the plurality of differential back-off values is a first plurality of differential back-off values. In some aspects, the wireless communication device may monitor the plurality of uplink carriers to determine an updated set of parameter values after applying the first plurality of differential back-off values, determine a second plurality of differential back-off values based at least in part on the updated set of parameter values, and may apply the second plurality of differential back-off values to the respective plurality of transmit powers. In some aspects, the second plurality of differential back-off values may be different from the first plurality of differential back-off values.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   determining, by a wireless communication device, a plurality of differential back-off values based at least in part on at least one of a set of parameter values relating to one or more of a plurality of uplink carriers associated with uplink carrier aggregation or any uplink grants associated with the plurality of uplink carriers, the plurality of differential back-off values relating to a specific absorption rate (SAR) back-off or a thermal back-off of the wireless communication device; and
   applying, by the wireless communication device, the plurality of differential back-off values to a respective plurality of transmit powers associated, respectively, with the plurality of uplink carriers.

2. The method of claim 1, further comprising:
   determining a total back-off value for the plurality of transmit powers; and
   wherein determining the plurality of differential back-off values comprises:
      determining the plurality of differential back-off values based at least in part on the total back-off value.

3. The method of claim 1, wherein a first back-off value, of the plurality of differential back-off values, is different from a second back-off value of the plurality of differential back-off values.

4. The method of claim 1, further comprising:
   determining that at least one of the of the plurality of uplink carriers has at least one of a discontinuous transmission period or no transmission in one or more upcoming frames; and
   determining whether to apply the plurality of differential back-off values to the plurality of transmit powers based at least in part on determining that the at least one of the plurality of uplink carriers has the at least one of the discontinuous transmission period or the no transmission in the one or more upcoming frames.

5. The method of claim 1, further comprising:
   determining that at least one of the plurality of uplink carriers has at least one of a discontinuous transmission period or no transmission in one or more upcoming frames; and
   wherein determining the plurality of differential back-off values comprises:
      determining the plurality of differential back-off values as a function of any uplink grants associated with the plurality of uplink carriers based at least in part on determining that the at least one of the plurality of uplink carriers has the at least one of the discontinuous transmission period or the no transmission in the one or more upcoming frames.

6. The method of claim 1, further comprising:
   determining at least one of an uplink transmission or an uplink grant for one or more uplink carriers, of the plurality of uplink carriers, in one or more upcoming frames; and
   wherein determining the plurality of differential back-off values comprises:
      determining the plurality of differential back-off values based at least in part on the uplink transmission or the uplink grant for the one or more uplink carriers in the one or more upcoming frames.

7. The method of claim 1, further comprising:
   determining any uplink grants associated with the plurality of uplink carriers; and
   wherein determining the plurality of differential back-off values comprises:
      determining the plurality of differential back-off values based at least in part on the uplink grants.

8. The method of claim 1, further comprising:
   determining the set of parameter values relating to the one or more of the plurality of uplink carriers, the set of parameter values including at least one of:
a channel quality indicator (CQI) parameter value,
a reference signal received power (RSRP) parameter value,
a signal to interference plus noise ratio (SINR) parameter value,
a quantity of uplink retransmissions value, or
a downlink parameter value corresponding to one or more of the plurality of uplink carriers.

9. The method of claim 1, wherein the plurality of differential back-off values is a first plurality of differential back-off values; and
the method further comprising:
monitoring the plurality of uplink carriers to determine an updated set of parameter values after applying the first plurality of differential back-off values;
determining a second plurality of differential back-off values based at least in part on the updated set of parameter values,
the second plurality of differential back-off values being different from the first plurality of differential back-off values; and
applying the second plurality of differential back-off values to the respective plurality of transmit powers.

10. The method of claim 1, further comprising:
determining one or more of a plurality of power amplifier switch thresholds respectively associated with the plurality of uplink carriers; and
wherein determining the plurality of differential back-off values comprises:
determining the plurality of differential back-off values based at least in part on the one or more of the plurality of power amplifier switch thresholds.

11. The method of claim 1, further comprising:
determining a plurality of consumption values relating to at least one of a radio frequency transceiver or a power amplifier associated with an uplink carrier of the plurality of uplink carriers; and
wherein determining the plurality of differential back-off values comprises:
determining the plurality of differential back-off values based at least in part on the plurality of consumption values relating to the radio frequency transceiver or the power amplifier.

12. A wireless communication device, comprising:
a memory; and
one or more processors operatively coupled to the memory, the one or more processors configured to:
determine a plurality of differential back-off values based at least in part on at least one of a set of parameter values relating to one or more of a plurality of uplink carriers associated with uplink carrier aggregation or any uplink grants associated with the plurality of uplink carriers,
the plurality of differential back-off values relating to a specific absorption rate (SAR) back-off or a thermal back-off of the wireless communication device; and
apply the plurality of differential back-off values to a respective plurality of transmit powers associated, respectively, with the plurality of uplink carriers.

13. The wireless communication device of claim 12, wherein the one or more processors are further configured to:
determine a total back-off value for the plurality of transmit powers; and
wherein the one or more processors, when determining the plurality of differential back-off values, are configured to:
determine the plurality of differential back-off values based at least in part on the total back-off value.

14. The wireless communication device of claim 12, wherein a first back-off value, of the plurality of differential back-off values, is different from a second back-off value of the plurality of differential back-off values.

15. The wireless communication device of claim 12, wherein the one or more processors are further configured to:
determine that at least one of the of the plurality of uplink carriers has at least one of a discontinuous transmission period or no transmission in one or more upcoming frames; and
determine whether to apply the plurality of differential back-off values to the plurality of transmit powers based at least in part on determining that the at least one of the plurality of uplink carriers has the at least one of the discontinuous transmission period or the no transmission in the one or more upcoming frames.

16. The wireless communication device of claim 12, wherein the one or more processors are further configured to:
determine that at least one of the plurality of uplink carriers has at least one of a discontinuous transmission period or no transmission in one or more upcoming frames; and
wherein the one or more processors, when determining the plurality of differential back-off values, are configured to:
determine the plurality of differential back-off values as a function of any uplink grants associated with the plurality of uplink carriers based at least in part on determining that the at least one of the plurality of uplink carriers has the at least one of the discontinuous transmission period or the no transmission in the one or more upcoming frames.

17. The wireless communication device of claim 12, wherein the one or more processors are further configured to:
determine at least one of an uplink transmission or an uplink grant for one or more uplink carriers, of the plurality of uplink carriers, in one or more upcoming frames; and
wherein the one or more processors, when determining the plurality of differential back-off values, are configured to:
determine the plurality of differential back-off values based at least in part on the uplink transmission or the uplink grant for the one or more uplink carriers in the one or more upcoming frames.

18. The wireless communication device of claim 12, wherein the one or more processors are further configured to:
determine any uplink grants associated with the plurality of uplink carriers; and
wherein the one or more processors, when determining the plurality of differential back-off values, are configured to:
determine the plurality of differential back-off values based at least in part on the uplink grants.

19. The wireless communication device of claim 12, wherein the one or more processors are further configured to:

determine the set of parameter values relating to the one or more of the plurality of uplink carriers,
the set of parameter values including at least one of:
a channel quality indicator (CQI) parameter value,
a reference signal received power (RSRP) parameter value,
a signal to interference plus noise ratio (SINR) parameter value,
a quantity of uplink retransmissions value, or
a downlink parameter value corresponding to one or more of the plurality of uplink carriers.

20. The wireless communication device of claim 12, wherein the plurality of differential back-off values is a first plurality of differential back-off values; and
wherein the one or more processors are further configured to:
monitor the plurality of uplink carriers to determine an updated set of parameter values after applying the first plurality of differential back-off values;
determine a second plurality of differential back-off values based at least in part on the updated set of parameter values,
the second plurality of differential back-off values being different from the first plurality of differential back-off values; and
apply the second plurality of differential back-off values to the respective plurality of transmit powers.

21. The wireless communication device of claim 12, wherein the one or more processors are further configured to:
determine one or more of a plurality of power amplifier switch thresholds respectively associated with the plurality of uplink carriers; and
wherein the one or more processors, when determining the plurality of differential back-off values, are configured to:
determine the plurality of differential back-off values based at least in part on the one or more of the plurality of power amplifier switch thresholds.

22. The wireless communication device of claim 12, wherein the memory and the one or more processors are included in a housing.

23. A non-transitory computer-readable medium storing one or more instructions for wireless communication, the one or more instructions comprising:
one or more instructions that, when executed by one or more processors of a wireless communication device, cause the one or more processors to:
determine a plurality of differential back-off values based at least in part on at least one of a set of parameter values relating to one or more of a plurality of uplink carriers associated with uplink carrier aggregation or any uplink grants associated with the plurality of uplink carriers,
the plurality of differential back-off values relating to a specific absorption rate (SAR) back-off or a thermal back-off of the wireless communication device; and
apply the plurality of differential back-off values to a respective plurality of transmit powers associated, respectively, with the plurality of uplink carriers.

24. The non-transitory computer-readable medium of claim 23, wherein the one or more instructions, when executed by the one or more processors, further cause the one or more processors to:
determine a total back-off value for the plurality of transmit powers; and
wherein the one or more instructions, that cause the one or more processors to determine the plurality of differential back-off values, further cause the one or more processors to:
determine the plurality of differential back-off values based at least in part on the total back-off value.

25. The non-transitory computer-readable medium of claim 23, wherein the one or more instructions, when executed by the one or more processors, further cause the one or more processors to:
determine that at least one of the plurality of uplink carriers has at least one of a discontinuous transmission period or no transmission in one or more upcoming frames; and
determine the plurality of differential back-off values as a function of any uplink grants associated with the plurality of uplink carriers based at least in part on determining that the at least one of the plurality of uplink carriers has the at least one of the discontinuous transmission period or the no transmission in the one or more upcoming frames.

26. The non-transitory computer-readable medium of claim 23, wherein the one or more instructions, when executed by the one or more processors, further cause the one or more processors to:
determine any uplink grants associated with the plurality of uplink carriers; and
wherein the one or more instructions, that cause the one or more processors to determine the plurality of differential back-off values, cause the one or more processors to:
determine the plurality of differential back-off values based at least in part on the uplink grants.

27. An apparatus for wireless communication, comprising:
means for determining a plurality of differential back-off values based at least in part on at least one of a set of parameter values relating to one or more of a plurality of uplink carriers associated with uplink carrier aggregation or any uplink grants associated with the plurality of uplink carriers,
the plurality of differential back-off values relating to a specific absorption rate (SAR) back-off or a thermal back-off of the apparatus; and
means for applying the plurality of differential back-off values to a respective plurality of transmit powers associated, respectively, with the plurality of uplink carriers.

28. The apparatus of claim 27, further comprising:
means for determining a total back-off value for the plurality of transmit powers; and
wherein the means for determining the plurality of differential back-off values comprises:
means for determining the plurality of differential back-off values based at least in part on the total back-off value.

29. The apparatus of claim 27, further comprising:
means for determining that at least one of the plurality of uplink carriers has at least one of a discontinuous transmission period or no transmission in one or more upcoming frames; and
means for determining the plurality of differential back-off values as a function of any uplink grants associated with the plurality of uplink carriers based at least in part on determining that the at least one of the plurality of uplink carriers has the at least one of the discontinuous transmission period or the no transmission in the one or more upcoming frames.

30. The apparatus of claim 27, further comprising:
means for determining any uplink grants associated with the plurality of uplink carriers; and
wherein the means for determining the plurality of differential back-off values comprises:
   means for determining the plurality of differential back-off values based at least in part on the uplink grants.

* * * * *